United States Patent
Aboutboul et al.

[15] 3,652,214
[45] Mar. 28, 1972

[54] PREPARATION OF SILICA GELS

[72] Inventors: Henri A. Aboutboul; Jerome H. Krekeler, both of Cincinnati, Ohio; William Kirch, Clinton, Iowa

[73] Assignee: National Petro Chemicals Company, Inc., New York, N.Y.

[22] Filed: Aug. 6, 1968

[21] Appl. No.: 750,733

[52] U.S. Cl............................................23/182, 252/451
[51] Int. Cl..................................................C01b 33/16
[58] Field of Search...........................23/182, 110; 252/451

[56] References Cited

UNITED STATES PATENTS

| | | | |
|---|---|---|---|
| 2,785,051 | 3/1957 | Miller | 23/182 |
| 2,834,739 | 5/1958 | Becker et al. | 23/182 |
| 2,863,727 | 12/1958 | Thornhill et al. | 23/182 |
| 2,978,298 | 4/1961 | Wetzel et al. | 23/182 |
| 3,041,140 | 6/1962 | Alexander | 23/182 |
| 3,081,154 | 3/1963 | Acker et al. | 23/182 |
| 3,337,299 | 8/1967 | Burke, Jr. | 23/182 |
| 3,367,742 | 2/1968 | Marotta et al. | 23/182 |
| 3,428,425 | 2/1969 | Marotta | 23/182 |
| 3,433,593 | 3/1969 | Reinhardt et al. | 23/182 |
| 3,453,077 | 7/1969 | Hyde | 23/182 |

Primary Examiner—Edward Stern
Attorney—Allen A. Meyer, Jr.

[57] ABSTRACT

Silica gels having narrow pore diameter distribution in the range of 300–600 A and surface areas in the range from 200–500 m.²/g., and the process of preparing such silica gels directly from water, comprising critically controlled steps of precipitation of the silica gel, heat aging the precipitated silica hydrogel slurry, washing the aged product with solutions of salts having a displacing effect on sodium, disintegrating the gel and freeze drying the hydrogel so as to remove substantially all of the water i.e., vacuum subliming the water from the gel after freezing said hydrogel particles at a temperature sufficient to maintain the water in the pores in the frozen state.

16 Claims, 4 Drawing Figures

3,652,214

PREPARATION OF SILICA GELS

BACKGROUND OF THE INVENTION

1. Field of the Invention

This invention relates to silica gels having a narrow pore diameter distribution in the pore diameter range of 300–600 A and surface areas ranging from 200–500 m.$^2$/g. and to a process for preparing such silica gels directly from an aqueous system.

2. Description of the Prior Art

Much of the technology in the area of silica gels involves the problem of making strong hard porous gel masses which will not shrink and crack upon being dried. The gels are useful as absorbents and catalyst bases. Gels of small particle size and narrow particle size distribution, about 50 microns mean diameter, have been found to be the most desirable for fluid bed or stirred reactor catalyst operations because they are more easily fluidized, reduce the amount of erosion of equipment and suffer less degradation by abrasion and particle rupture.

The only such silica gels thus far reported having suitable particle size and narrow pore size distribution in the range of 300–600 A and surface area of 200–500 m.$^2$/g. for the purpose mentioned above are those described in our copending application Ser. No. 750,734, filed Aug. 6, 1968. In that application there was disclosed a process for preparing the gels with the specified properties.

Because the water is strongly absorbed on the silica gel by hydrogen bonding, to the silanol groups which cover the surface, this process included a cumbersome step of displacing the water with a nonaqueous system prior to drying the gel to reduce the surface tension and other interfacial forces involved in the dehydration process.

The above-described process has also the disadvantage of being rather expensive since it entails the use of large amounts of organic solvents, a substantial proportion of which generally cannot be recovered.

The drying of the silica gel in order to avoid shrinkage was also described by Kistler in U.S. Pat. Nos. 2,093,454 and 2,249,767. The patents describe a process of heating the gel under sufficient pressure to provide evaporation within the gel, without gas phase formation until the critical temperature of the liquid is reached. At this point, the liquid phase is converted to the gas phase instantaneously thus avoiding a gas-liquid interference. Once the gas phase has been reached, the gas may be withdrawn without causing any collapse of the solid structure. However, when the liquid phase of the silica gel is water, this process cannot be used since such gels ordinarily undergo dissolution before the critical temperature is reached. The aqueous phase of the hydrogel has then to be replaced with an organic solvent as in our copending application, Ser. No. 750,734, filed Aug. 6, 1968, with the above-described disadvantages.

By maintaining critical control of conditions during precipitation, heat aging, washing, reduction of particle size, and by freezing and vacuum drying the gel while the water in the pores of the gel is maintained in the frozen state, it has now been found that the desired product is obtained directly from an aqueous system.

SUMMARY OF THE INVENTION

The present invention provides silica gels having a narrow pore diameter distribution primarily in the range of from 300–600 A, surface areas ranging from 200–500 m.$^2$/g. and stability at temperatures of up to about 2,000° F. in a fluidized bed. The invention further describes a process for preparing the foregoing silica gels directly from water which comprises the following steps:

1. Precipitation of a silica gel by neutralization of an aqueous silica salt, such as $xNa_2O \cdot ySiO_2$, with a strong acid, a weak acid such as $CO_2$, ion exchange resins, or by other suitable neutralization procedure, carried out in stoichiometric proportions under agitation and in accordance with the following conditions:
    a. The $SiO_2$ concentration in the final slurry is between 5 and 12 percent by weight and preferably from about 8 to 9 percent,
    b. the neutralization medium is added at the rate of up to 40 percent of the needed amount in from 30 minutes to 120 minutes, and preferably about 60 minutes, and the remaining 60 percent of the amount is added in from about 20 to 90 minutes more, and preferably about 45 minutes more,
    c. the temperature during precipitation is maintained between about 0° and 10° C. and preferably at about 5° C., and
    d. the final pH of the precipitate is from 3 to 8 and preferably between about 5 and 6.
2. Heating the precipitated silica hydrogel slurry under the following conditions:
    a. A pH of from 3 to 8, and preferably between 5 and 6,
    b. a temperature between 50° and 100° C., and preferably about 90° C., and
    c. for a period of from 1 to 6 hours and preferably about 4 hours.
3. Washing the product with salts having a displacing effect on sodium so that the filtrate titrates less than 20p.p.m. sodium concentration. Suitable salts include aluminum chloride or sulfate and ammonium chloride or nitrate. The displacing can also be accomplished by washing with strong acid such as hydrochloric acid.
4. Comminuting and reducing the gel particle size by high shear mixing from step 3 to obtain particles having a mean diameter of less than about 200 microns and preferably in the range of from 30 to 150 microns.
5. Vacuum freeze drying the product.

DETAILED DESCRIPTION OF THE INVENTION

The invention will now be described in greater detail with reference to specific examples which illustrate the criticality of process conditions in order to obtain a silica xerogel product having a narrow pore diameter distribution primarily in the range of from 300–600 A, surface area in the range of from 200–500 m.$^2$/g. and stability at temperatures up to 2,000° F. in a fluidized bed.

The properties of the silica xerogel obtained in accordance with the invention and particularly the porosity characteristics are discussed in terms of pore volume (PV), surface area (SA), average pore diameter (Pd), where $Pd = 4PV/SA$, and pore size distribution. Determinations of the values for the various properties are made by a nitrogen absorption-desorption technique well known in the art and described in detail in the literature. For example, descriptions of the nitrogen absorption-desorption procedure for evaluating porosity of silica gels are found in the Journal of the American Chemical Society, Volume 60, page 309 (1938), Journal of Catalysis, Volume 2, page 111 (1955) and elsewhere.

In the following example, Example I is a description of a preferred method for carrying out the process of the invention to obtain a silica gel of the stated characteristics. The remainder of the examples illustrate the criticality of various process conditions or describe suitable alternative procedures for obtaining the silica gels.

EXAMPLE I

Twenty thousand one hundred and sixty g. of sodium silicate solution containing 28.7% $SiO_2$ and 8.9% $Na_2O$ was added to 25,440 g. of $H_2O$ and the mixture cooled to 5° C. under agitation.

Twenty-one thousand three hundred and five g. of $H_2SO_4$ (12.75 wt. percent) were then added as follows:

Eight thousand five hundred and twenty g. were added in 1 hour and the remaining amount in 45 minutes. The final pH of the precipitate was 5.0.

The slurry was then heated to 95° C. within 2 hours and maintained at 95° C. for 2 hours.

A 30 g. sample was drawn and washed with a solution of 10 g. of $NH_4NO_3$ in 3,000 ml. of $H_2O$, then with deionized water until the filtrate titrated less than 20 p.p.m. $Na_2SO_4$. The product was homogenized and 10 g. of the slurry containing 8.5 percent solid was vacuum freeze dried using a New Brunswick Model B-67 freeze dryer. The cold trap was set at $-120°$ C. and the sample, prefrozen, maintained at $-40°$ F.

One gram of sample was recovered and calcined in the oven at 1,000° F. for 4 hours before evaluating it. Physical properties of the silica gel obtained were: $S.A. = 321$ m.$^2$/g., $P.V. = 2.49$ cm.$^3$/g., $Pd = 312$ A.

Calcination in a fluidized bed for 3 hours at 1,800° F., did not alter the physical properties: $S.A. = 329$ m.$^2$/g., $P.V. = 2.47$ cm.$^3$/g., $Pd = 301$ A.

Figure 1:
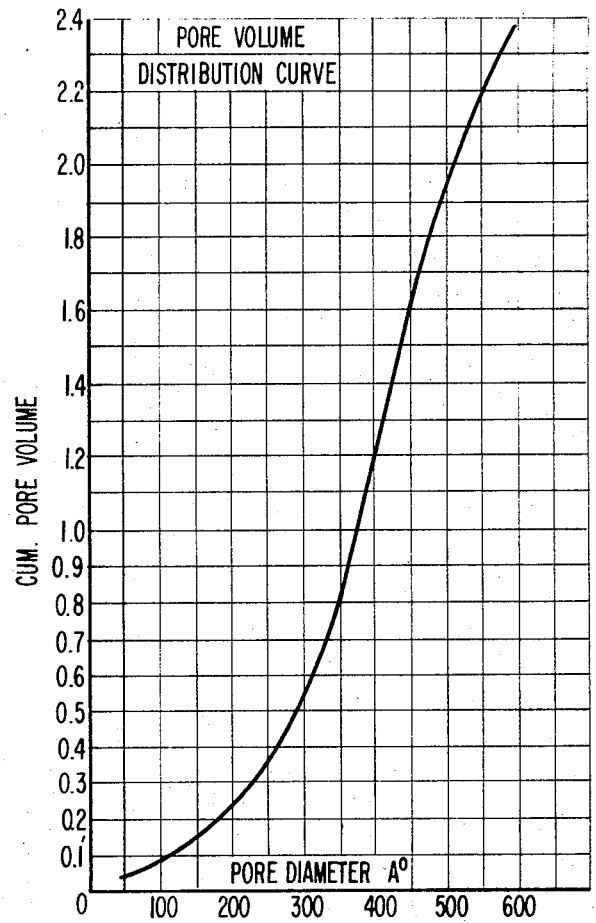

Referring to FIG. 1 of the drawings, which is a distribution curve of the pore sizes, it will be seen that the major portion of the cumulative pore volume of the silica gel product is accounted for by gel having a pore size distribution in the narrow range of from 300 A. to 600 A.

EXAMPLE II

To compare the freeze drying technique to the water displacement technique, disclosed in copending application a 30 g. sample was prepared as in Example I and was washed until the filtrate titrated less than 20 p.p.m. $Na_2SO_4$. The product was then homogenized, reslurried in acetone and washed with acetone by decantation until the water in the acetone titrated less than 1 percent.

The acetone was distilled off and the resulting silica gel was calcined in an oven at 1,000° F. for 4 hours.

Physical properties of the silica obtained were found to be substantially the same as those obtained by the water displacement technique, $S.A. = 327$ m.$^2$/g., $P.V. = 2.61$ cm.$^3$/g., $Pd = 319$ A.

EXAMPLE III

All the variable during precipitation, except the concentration of the silica were maintained he same as in Example I. The final $SiO_2$ concentration of 7% and 10% were chosen and FIG. 2 shows the effect of $SiO_2$ concentration on the porosity of the gel just after precipitation.

Figure 2:
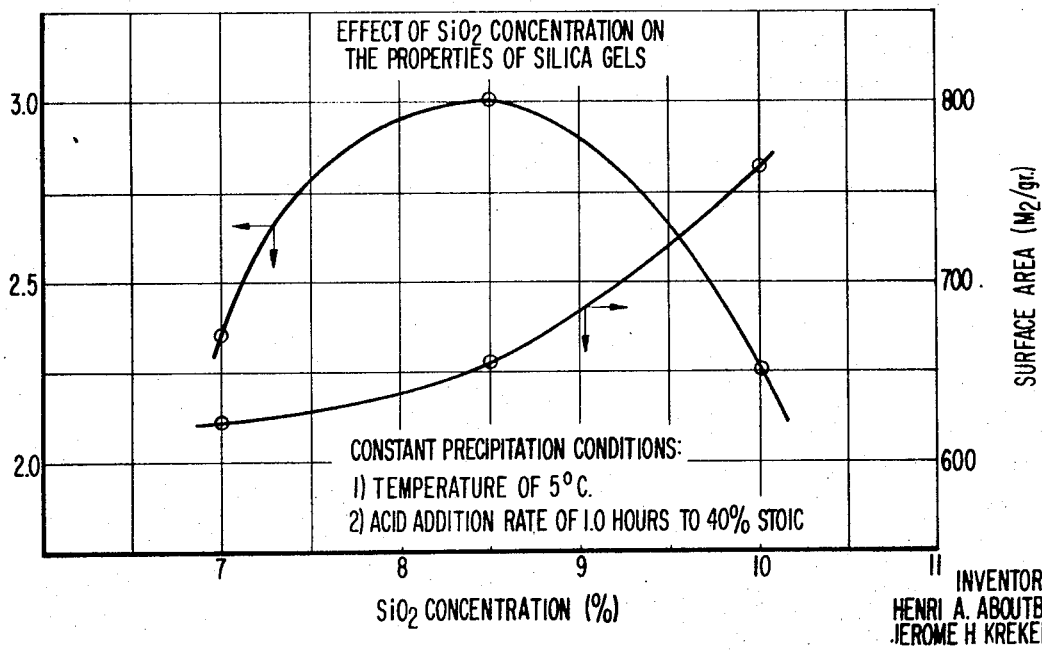

Referring to FIG. 2 of the drawing, it will be seen that relatively lower pore volumes are obtained where the final silica concentration in the slurry is 7% and 10% as compared with the pore volume obtained in Example I where an $SiO_2$ concentration of about 8.5 percent was obtained. FIG. 2 also demonstrates that the surface area increases as the $SiO_2$ concentration increases. Thus, in order to get maximum pore volume and at the same time to obtain a good surface area level, it is preferable to maintain the $SiO_2$ concentration at between about 8% and 9% and most preferably at about 8.5 percent.

EXAMPLE IV

All variables during precipitation, except acid addition rate, were maintained as in Example I. Acid addition rate of 0.5 hr. and 2.0 hrs. for the addition of 40 percent of the stoichiometric amount of $SiO_2$ were used.

Figure 3:
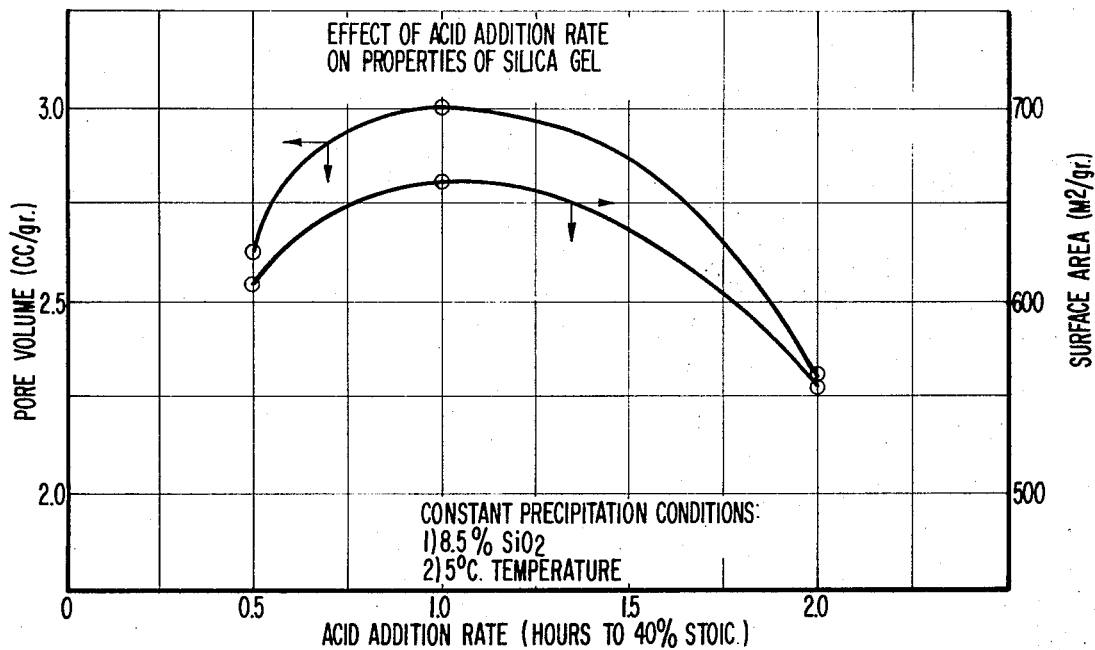

Example IV clearly illustrates, as shown in FIG. 3 of the drawings, that both pore volume and surface area are dependent upon the rate in which the neutralizing medium, in this case, sulfuric acid, is added to the aqueous silicate solution. It will be seen that optimum pore volume and surface area values are obtained using an addition rate of about 1 hour for 40 percent of the stoichiometric amount and that lower values for pore volume and surface area are obtained where more rapid or slower addition rates are employed.

EXAMPLE V

All variables during precipitation, except temperature, were maintained as in Example I. Temperatures of 25° C. and 50° C. were used during precipitation.

Figure 4:
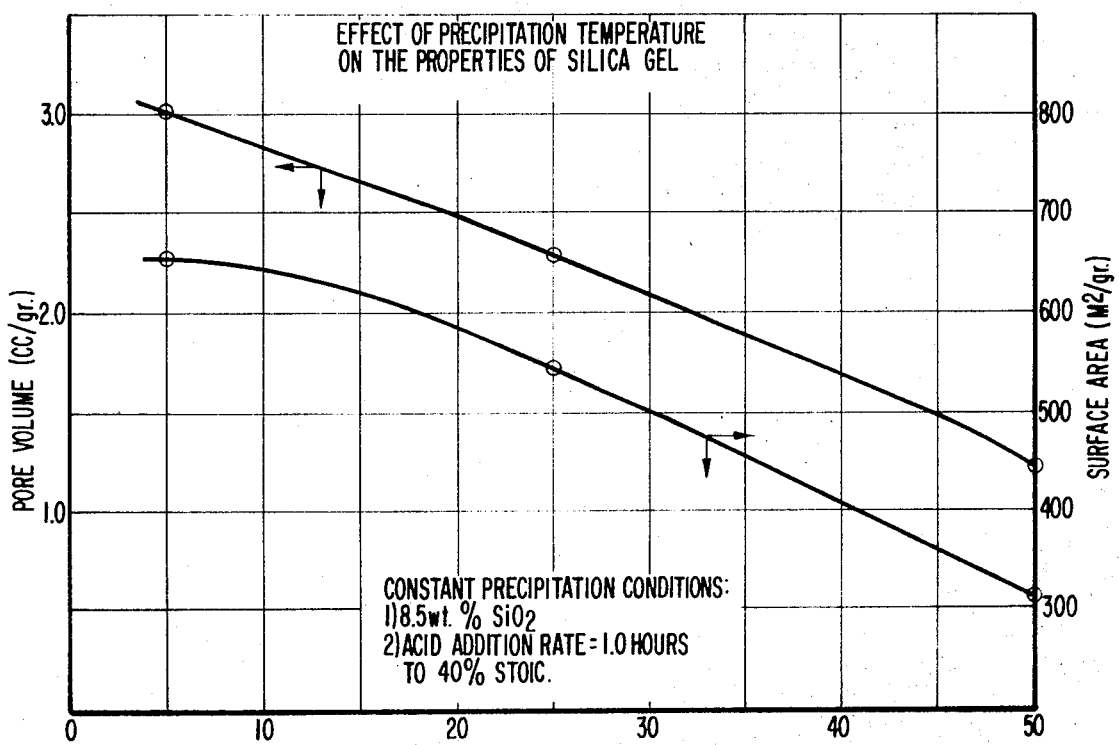

As will be seen by reference of FIG. 4, the pore volume decreases as the precipitation temperature increases. Surface area also tends to decrease with an increase in the precipitation temperature, but this value flattens out at about 5° C. This is the preferred temperature of precipitation in order to secure optimum values for pore volume and surface area.

EXAMPLE VI

All variables during precipitation were maintained the same as in Example I, except $CO_2$ was used to neutralize the sodium silicate instead of sulfuric acid. The physical properties of the silica gel were similar to those obtained under Example I.

EXAMPLE VII

All variables during precipitation were maintained as in Example I. After precipitation, the gel was adjusted to pH 9.0 by adding NaOH (2-normal) and heating for one hour. The gel was then washed with water and acetone as in Example II before evaluating it.

The properties of the silica gel were $S.A. = 346$ m.$^2$/g., $P.V. = 1.96$ cm.$^3$/g., $Pd = 226$ A.

As will be seen by comparing the properties of the gel obtained in accordance with Example VII with a product of Example I, too high pH and relatively brief heating during the aging step results in a loss of pore volume. The pore volume obtained in Example I was 2.49 cm.$^3$/g. as compared with only 1.96 cm.$^3$/g., for Example VII.

EXAMPLE VIII

All variables during precipitation were again maintained as in Example I. After precipitation the gel was adjusted to pH 5.0 by adding $H_2SO_4$ (1-normal), and heated to 95° C. for 4 hours. Samples were taken after different lengths of time, washed with water and then with acetone as in Example II before evaluating them.

Table I shows the influence of the length of heating time on the porosity of the gel and its pore distribution:

TABLE I

| Time(hrs.) | S.A.(m.$^2$/g) | P.V.(cm.$^3$/g.) | Pd(A.) |
| --- | --- | --- | --- |
| 0 | 757 | 2.77 | 147 |
| ½ | 492 | 2.72 | 221 |
| 1 | 394 | 2.90 | 2.94 |
| 1-1/2 | 355 | 2.76 | 311 |
| 2 | 343 | 2.77 | 323 |
| 4 | 284 | 2.56 | 362 |

As will be seen from the data reported in Table I, the thermal aging of the precipitation should be conducted for a minimum of about 1 hour in order to obtain a silica xerogel product having an average pore diameter in the desired range of from about 300 to 600 A.

EXAMPLE IX

All variables during precipitation and heating were again maintained as in Example I. The gel was then washed as in Example I, but only until the filtrate titrated 100 p.p.m. $Na_2SO_4$. The product was then treated with acetone and evaluated. The physical properties of the gel were substantially the same as in Example I.

When the product was calcined in a fluidized bed at 1825° F. for 3 hours and evaluated, the properties were:
$S.A. = 225$ m.$^2$/g., $P.V. = 1.62$ cm.$^3$/g., $Pd = 286$ A.

As will be seen from the porosity values of the product obtained in accordance with Example IX, the surface area pore volume and average pore diameter are all adversely affected by the relatively high level of $Na_2SO_4$ left in the product.

EXAMPLE X

Examples X and XI show that when water is present during the drying step, even in small quantities, the properties are adversely affected even when freeze drying is not used.

All variables during precipitation heating and water washing were maintained as in Example I. The gel was then washed with acetone until the water in the acetone titrated 5 percent in order to show the criticality of the water level in the hydrogel prior to drying (even without freeze drying) on the physical properties of the gel.

The acetone was then distilled off and the silica gel evaluated.

Physical properties were: $S.A. = 248$ m.$^2$/g., $P.V. = 1.79$ cm.$^3$/g., $Pd = 289$ A.

The product obtained in accordance with example X is also adversely affected in terms of surface area, pore volume and average pore diameter by the failure to reduce the water level in the gel to a value of less than about 1% by weight as was achieved in Example I.

EXAMPLE XI

In this example, a silica gel produced as in Example I was tray dried at 80° C.

Physical properties of the gel were: $S.A. = 110$ m.$^2$/g., $P.V. = 0.41$ cm.$^3$/g., and $Pd = 149$ A.

The product obtained by tray drying at 80° C. is severely adversely affected in terms of surface area, pore volume and average pore diameter in comparison with the results obtained by freeze drying as in Example I.

While the invention has been particularly shown and described with reference to a preferred embodiment thereof, it will be understood by those skilled in the art that various changes in form and details may be made therein without departing from the spirit and scope of the invention.

What is claimed is:

1. A method for producing a silica xerogel having a narrow pore size distribution primarily within the range of from 300–600 A, a surface area within the range of from 200–500 m.$^2$/g. and stability at temperatures up to about 2,000° F. in a fluidized bed, comprising:
   a. precipitating a silica hydrogel by neutralization of an aqueous solution of sodium silicate to provide a silica hydrogel slurry having an SiO$_2$ concentration of from about 5 to 12% and a pH of from about 3 to 8, the temperature during precipitation being maintained between 0° and 10° C., the neutralization medium being added at the rate of up to 40 percent of the stoichiometric amount within from 30 to 120 minutes and the remaining amount of such medium being added within from about 20 to 90 additional minutes,
   b. heating the product of step (a) at a pH of from about 3 to 8 and at a temperature of from about 50° to 100° C., for from about 1 to 6 hours,
   c. washing the product of step (b) to reduce the sodium ion concentration of the product of step (b) such that the filtrate titrates less than about 20 p.p.m.,
   d. comminuting the product of step (c) by high shear mixing to reduce the size of the hydrogel particles to a mean diameter of less than about 200 microns,
   e. freezing said hydrogel particles at a temperature sufficient to maintain the water in the pores in the frozen state, and
   f. vacuum subliming so as to remove essentially all the water from said gel.

2. The method claim 1 wherein the precipitation of silica hydrogel in step (a) is accomplished by neutralization of the aqueous solution of sodium silicate with an agent selected from the group consisting of a strong acid, a weak acid, and an ion-exchange resin.

3. The method of claim 2 wherein the precipitation of silica hydrogel in step (a) is accomplished by neutralizing with a strong acid.

4. The method of claim 1 wherein the SiO$_2$ concentration in the hydrogel precipitate of step (a) is from about 8 to 9 percent by weight.

5. The method of claim 1 wherein the temperature during neutralization step (a) is about 5° C.

6. The method of claim 1 wherein the pH of the hydrogel precipitation in step (a) is adjusted to from about 5 to 6.

7. The method of claim 1 wherein pH of the slurry in step (b) is from about 5 to 6.

8. The method of claim 1 wherein the temperature of the slurry during step (b) is about 90° C.

9. The method of claim 1 wherein the time of step (b) is about 4 hours.

10. The method of claim 1 wherein the reduction of concentration of Na ions is accomplished by washing with a solution of displacing salts.

11. The method of claim 10, wherein said salts are selected from the group consisting of aluminum chloride, aluminum sulfate, ammonium chloride, ammonium nitrate or mixtures thereof.

12. The method of claim 1 wherein step (c) is accomplished by washing with a solution of a strong acid.

13. The method of claim 12 wherein said acid is selected from the group consisting of HCl and H$_2$SO$_4$.

14. The method of claim 1 wherein said hydrogel is frozen at a temperature of between −100° C. and −10° C.

15. A method for producing a silica xerogel having a narrow pore size distribution primarily within the range of from 300–600 A, a surface area within the range of from 200–500 m.$^2$/g. and stability at temperatures up to about 2,000° F. in a fluidized bed, comprising:
   a. precipitating a silica hydrogel by neutralization of an aqueous solution of sodium silicate to provide a silica hydrogel slurry having an SiO$_2$ concentration of from about 8 to 9 percent by weight, the temperature during precipitation being maintained at about 5° C., and the pH of the precipitate being maintained at from about 5 to 6, the neutralization medium being added at the rate of up to 40 percent of the stoichiometric amount within from 30 to 120 minutes and the remaining amount of such medium being added within from 20 to 90 additional minutes,
   b. heating the product of step (a) at a temperature of about 90° C. for about 4 hours,
   c. washing the product of step (b) to reduce the sodium concentration, measured as Na$_2$SO$_4$, so that the filtrate from the washing titrates less than 20 p.p.m. of sodium,
   d. disintegrating the product of step (c) by high shearing mixing to reduce the size of the hydrogel particles to a mean diameter in the range of from 30 to 150 microns,
   e. freezing said hydrogel particles at a temperature sufficient to maintain the water in the pores in the frozen state, and
   f. vacuum subliming so as to remove essentially all the water from said gel.

16. A method for producing a silica xerogel having a narrow pore size distribution primarily within the range of from 300–600 A, a surface area within the range of from 200–500 m.$^2$/g. and stability at temperatures up to about 2,000° F. in a fluidized bed, comprising:
   a. precipitating a silica hydrogel by neutralization of an aqueous solution of sodium silicate to provide a silica hydrogel slurry having an SiO$_2$ concentration of from about 5 to 12 percent and a pH of from about 3 to 8, the temperature during precipitation being maintained between 0° and 10° C., the neutralization medium being added at the rate of up to 40 percent of the stoichiometric amount within from 30 to 120 minutes and the remaining amount of such medium being added within from about 20 to 90 additional minutes,
   b. heating the product of step (a) at a pH of from about 3 to 8 and at a temperature of from about 50° to 100° C. for from about 1 to 6 hours, c. washing the product of step (b) to reduce the sodium ion concentration of the product of step (b) such that the filtrate titrates less than about 20 p.p.m.,
d. freezing the product of step (c) at a temperature sufficient to maintain the water in the pores in the frozen state,
e. comminuting the product of step (d) by high shear mixing to reduce the size of the hydrogel particles to a mean diameter of less than about 200 microns, and
f. vacuum subliming so as to remove essentially all the water from said gel.

* * * * *